United States Patent [19]

Blizzard et al.

[11] 4,347,060
[45] Aug. 31, 1982

[54] METHOD FOR MAKING ANTIMONY TRIOXIDE POWDER

[75] Inventors: Roy L. Blizzard, Mission Viego, Calif.; Thomas O. Martin, Pasadena, Tex.

[73] Assignee: PPG Industries, Inc., Pittsburgh, Pa.

[21] Appl. No.: 256,436

[22] Filed: Apr. 22, 1981

Related U.S. Application Data

[63] Continuation-in-part of Ser. No. 86,379, Oct. 19, 1979, abandoned.

[51] Int. Cl.³ ............................................. B01D 7/00
[52] U.S. Cl. .................................. 23/294 R; 250/531; 422/186; 422/244, 422/183.04
[58] Field of Search ............. 23/294 R; 250/527, 531; 422/186, 244

[56] References Cited

U.S. PATENT DOCUMENTS

| | | | |
|---|---|---|---|
| 1,987,282 | 1/1935 | Comte | 23/294 |
| 2,035,453 | 3/1936 | Betterton et al. | 23/294 |
| 2,177,551 | 10/1939 | Perkins et al. | 23/144 |
| 3,275,412 | 9/1966 | Skrivan | 23/202 |
| 3,328,126 | 6/1967 | Di Stefano et al. | 23/202 |
| 3,449,072 | 6/1969 | Freeman | 23/142 |
| 3,516,879 | 6/1970 | Paine | 149/1 |
| 3,525,595 | 8/1970 | Zirngibl et al. | 23/284 |
| 3,574,546 | 4/1971 | Skrivan | 23/202 |
| 3,738,824 | 6/1973 | Davis et al. | 75/0.5 B |
| 3,743,708 | 7/1973 | Chase et al. | 423/617 |
| 3,840,750 | 10/1974 | Davis et al. | 250/547 |
| 4,174,203 | 11/1979 | Borer et al. | 23/294 R |

FOREIGN PATENT DOCUMENTS

| | | | |
|---|---|---|---|
| 2722432 | 12/1977 | Fed. Rep. of Germany | 423/617 |
| 437895 | 11/1935 | United Kingdom | 23/294 R |
| 626789 | 8/1978 | U.S.S.R. | 23/294 R |

Primary Examiner—O. R. Vertiz
Assistant Examiner—Wayne A. Langel
Attorney, Agent, or Firm—Irwin M. Stein

[57] ABSTRACT

A method and apparatus for making an antimony trioxide powder having a specific particle size distribution from crude antimony trioxide which contains a small amount of impurities having a higher vaporization temperature by passing the crude antimony trioxide through a plasma arc tail gas reaction zone, vaporizing in a chamber communicating with the reaction zone the antimony trioxide at a temperature that liquifies the impurities, exiting the gases from the chamber through one port, draining the liquified impurities from the chamber through the port, contacting the exiting materials with a quench gas, mechanically clearing the exit port of solidified impurities and separating the antimony trioxide powder from the other exiting materials.

10 Claims, 2 Drawing Figures

PLASMA ARC REACTOR HEAD

PLASMA ARC REACTOR HEAD

METHOD FOR MAKING ANTIMONY TRIOXIDE POWDER

CROSS-REFERENCE TO RELATED APPLICATIONS

This application is a continuation-in-part application of our copending U.S. Patent Application Ser. No. 86,379, filed Oct. 19, 1979 for Method and Apparatus for Making Antimony Trioxide Powder, and now abandoned.

DESCRIPTION OF THE INVENTION

This invention relates to a method for making submicron antimony trioxide powder and to the apparatus used to prepare such powder. More particularly, this invention relates to a method for making submicron antimony trioxide powder having a specific particle size distribution from antimony trioxide ore which contains a small amount of metal oxide impurities having a vaporization temperature higher than antimony oxide.

Antimony trioxide has been widely used as a flame retardant synergist with halogenated hydrocarbon compounds, particularly chlorinated or brominated organic compounds in the plastics industry to provide maximum flame retardancy in synthetic plastics or resins, such as acrylonitrile-butadiene-styrene, high impact polystyrene, polystyrene, polypropylene, polyethylene and the like, or synthetic textile fibers such as modacrylic (copolymers of acrylonitrile that contain from 35 to 85 percent acrylonitrile) and the like. These polyethylene flame retardant systems are incorporated into the synthetic substrate in relatively small but effective amounts. However, the addition of any type of additive to a plastic substrate usually alters the physical properties of the original plastic in some way. Hence, it is always desired to improve flame retardancy while minimizing the effect on physical properties of the plastic substrate.

It has been proposed that when antimony trioxide is finely divided and evenly distributed in the plastic, the physical properties of the plastic substrate are less affected. Further, in accordance with this belief, the more finely divided and evenly distributed are the antimony trioxide particles, the less the adverse effect on physical properties. However, it is difficult to disperse evenly a very finely divided power such as antimony trioxide in a viscous material, e.g., a thermoplastic or thermosetting plastic resin, owing to the wettability of the particle, electrostatic forces and other factors. Consequently, agglomeration, aggregation, and/or flocculation of the powder particles can occur and substantially affect the physical properties of the mixture. Hence, it is often better to use a larger particle size of antimony oxide with complete dispersion in preference to incomplete dispersion of a finer grade.

In many cases it may be required that the tint strength of the antimony trioxide be low, i.e., few particles in the optimum tint range of from about 0.25 to about 0.35 microns. This requirement further complicates the preparation of antimony trioxide having a particle size distribution which does not include too many particles that are too small and/or too many particles within the optimum tint range.

When submicron-size particles of antimony trioxide powder have a narrow distribution within a range smaller than the optimum tint size range, it is difficult to compound the small particles evenly within the substrate, especially when the substrate is highly viscous, e.g., acrylonitrile-butadiene-styrene (ABS) resin. On the other hand, when submicron-size particles of antimony trioxide powder have a narrow or broad distribution within a range that is larger than the optimum tint size range, then it adversely affects the physical properties of the plastic.

It has now been found that submicron antimony trioxide powder having a particular particle size and particle size distribution can be blended into a substrate, particularly ABS, high impact polystyrene (HIPS), polystyrene, polypropylene and the like, by conventional dispersing means without detrimental agglomeration, aggregation, or flocculation; without significantly imparting tint; and without significantly affecting the physical properties of the plastic substrate.

The aforesaid antimony trioxide powder has a weight mean particle size between about 0.1 micron (0.0001 mm) and about 0.5 micron (0.0005 mm). Between about 5 percent and 15 percent of the particles by weight are larger than 1 micron. (The aforesaid measurement by weight is by a Sedigraph, a Trademark of Micrometrics.) The powder will typically have above about 90 percent of its particles by population smaller than 1 micron (0.001 mm). From the evidence at hand, it is believed that having a small percentage of the particles larger than 1 micron aids in compounding by avoiding agglomeration, aggregation and flocculation without substantially affecting the physical properties of the plastic substrate.

The aforesaid antimony trioxide powder has a broad particle size distribution. By a broad particle size distribution is meant that the powder is characterized by a typical bell-shaped distribution and the particles of the powder are not all of the substantially same particle size. Typically, between about 70 and 80 weight percent of the particles are in the size range of from 0.1 to 0.5 microns.

The antimony trioxide powder of the present invention can be prepared by a plasma arc process, including vaporization and condensation of crude antimony trioxide, as described hereinafter. It is believed that the powder can be made also by the use of a conventional kiln.

The plasma arc process includes control of quenching, control of slag accumulation, and a temperature operating range that allows production of the above-described antimony trioxide powder having a broad particle size distribution. Quenching (and condensation) of the vapors of antimony trioxide is conducted immediately upon removal of the vaporized antimony trioxide from the vaporization zone by use of a gaseous quench medium, e.g., air, provided by quench means located as close as possible to the exit port from which vaporized antimony trioxide is exhausted from the vaporization chamber. The plasma arc reactor is operated in a manner such that the work (stabilizing) gas has a temperature sufficient to vaporize the antimony trioxide and form a liquid slag of the less volatile metal oxide impurities in the crude antimony oxide material. The liquid slag is removed mechanically after it drains from the bottom of the exit port and solidifies. Hence, quenching, which is critical to the whole process, is not encumbered by slag buildup. Regulating the volume of the gaseous quench medium directly varies the particle size distribution. Further, the rate of quenching also affects the ultimate particle size.

The invention is particularly useful as a flame retardant synergist for ABS, HIPS, polystyrene and polypropylene plastic resins when incorporated therein in low effective amounts. Uniform dispersion is necessary and can be approached by conventional means of compounding, such as extrusion and milling.

BRIEF DESCRIPTION OF THE DRAWING

The invention will be better understood in view of the detailed description made below with reference to the drawings which illustrate the bottom portion of a plasma arc reactor having a single exit port, quenching means, exit port clearing means and quenching means for the bottom of the reactor.

DETAILED DESCRIPTION OF THE INVENTION

Figure 2:
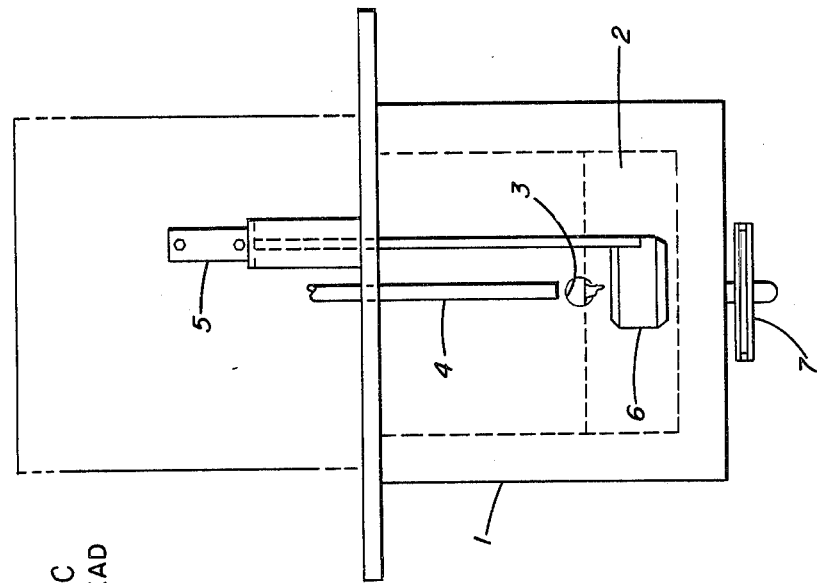

In accordance with the present invention, there is provided submicron antimony trioxide powder of a particular particle size distribution for use as a flame retardant synergist. Included among the various synthetic materials, particularly fibers and plastics, with which the aforesaid antimony trioxide powder can be used are: polyacrylonitriles, copolymers of acrylonitrile with vinyl and vinylidene halides, i.e., chlorides, polyamides, polyesters, polyurethanes, polyacrylates, polyvinyl chlorides, acrylonitrile-butadiene-styrene (ABS) polymers, polyethylenes, polypropylenes, polystyrenes and the like. Typically, the powder is used in combination with halogenated, e.g., brominated and/or chlorinated, organic flame retardant additives such as decabromodiphenyl oxide, 1,2-di(tribromophenoxy)ethane, and the like. The antimony oxide powder is used in a ratio of about 4 to about 15 percent by weight of the synthetic resin.

The antimony trioxide powder of the present invention has a weight mean particle size of between about 0.1 and about 0.5 micron. Such powder does not, for the most part, plug spinnerettes during the manufacture of fibers, and does not significantly affect the physical properties, e.g., impact strength, of certain virgin plastic materials, e.g., acrylonitrile-butadiene-styrene resin.

Between about 5 percent and 15 percent of the particles by weight are larger than 1 micron. This provides enough particles in the distribution to aid in blending the powder with the plastic substrate in either a master batch or in ratios of end use concentrations when conventional mixing apparatus such as Banbury mixers, continuous intensive mixers, rool mills, extruders, and the like are used. The large particles reduce the tendency of the smaller particles to agglomerate, aggregate and flocculate owing to their abrasiveness, physical size and lesser tendency to being attracted by electrostatic forces.

By population, on average, above about 90, e.g., 90 to 98, percent of the particles of the powder are less than 1 micron in size. More particularly, it has been found that greater than 50, e.g., 50 to 75 percent of the particles of the powder are less than about 0.1 micron. Commonly about 90 percent are less than about 0.3 micron and about 98 percent are less than about 0.8 micron. This population distribution provides for maximum flame retardancy while effecting relatively little reduction in the physical properties of the plastic substrate so long as the powder is uniformly dispersed. However, these benefits may not be realized if other solid additives having large populations of large particles which adversely affect these same properties are present.

The antimony trioxide powder of the present invention can be produced by a novel plasma arc process. Use of a plasma arc to vaporize antimony compounds is well known. See, for example, U.S. Pat. Nos. 3,840,750 and 3,743,708. These known methods include feeding raw antimony compounds into the tail of a plasma arc produced by passing an inert gas through the arc. The antimony compound is vaporized, oxidized, or reduced and directed to a quench zone in a manner that permits separation of condensed particles from the inert gas.

Sources of crude antimony trioxide ore (90 to 99, e.g., 95 to 99, percent antimony trioxide) also typically contain from 1 to 10 weight percent of oxides of other metals and metalloids such as arsenic (in traces to 1 percent), silica (0.5 to 1 or 5 percent), lead (0.05 to 2 percent), iron (0.02 to 2 percent), and sulfur (in traces). These oxides (hereinafter metal oxides) form a slag during vaporization of the crude antimony trioxide ore. This slag is handled specially in accordance with the present process in order to avoid affecting the critical quenching process. Otherwise, slag accumulates and disrupts uniform quenching of the vaporized antimony trioxide, which, in turn, causes more slag accumulation and eventually results in plugging of the vaporization zone.

In the present process, vaporization is carried out at a temperature at which antimony trioxide vaporizes and the slag component of the ore (other metal oxide materials) merely melt or liquify. This liquid melt coats the reactor walls with a film that is protective and which allows further accumulation of the melting slag in aerosol form. The liquid portion of the melting slag settles to the bottom of the reactor. The temperature of the vaporization zone at the reactor entrance is calculated to be about 2,200° Centigrade to about 2,800° Centigrade. It is most preferred that the temperature at that entrance be about 2,500° Centigrade.

The reactor is preferably equipped with only one exit port. While it is conceivable that more than one port may be operable, it is thought that adverse cooling conditions are created thereby in the reactor, thus causing varying quenching conditions from exit port to exit port. Consequently, slag will build up at one exit port and upset other factors, which causes poor yield and eventually stops production at all exit ports. In contrast, with one exit port, an equilibrium condition can be easily established and quenching conditions can be easily stabilized without slag buildup and obstruction of the exit port with solidified slag.

The exit port is located on the side of the reactor so that the bottom of the reactor can be filled with liquid slag melt, which accumulates and drains out of the reactor from the bottom of the exit port while vaporized antimony oxide and the inert gases exit the remaining open portion of the exit port. Quench gas, e.g., compressed air, which condenses and solidifies the vaporized antimony trioxide also solidifies the liquid slag melt at the exit port. This solidified slag is mechanically removed from the exit port to keep it clear. Such mechanical means include a hydraulically operated knife edge or blade.

Figure 1:
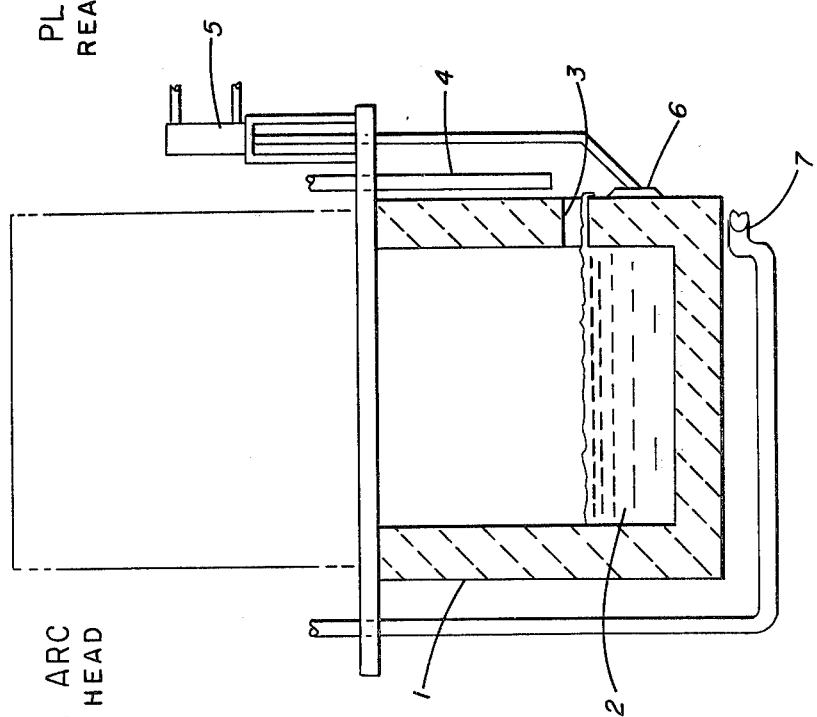

Reference is now made to the appended FIGS. 1 and 2, which depict two views of the bottom portion (partly in section) of a reactor chamber. Attached to the top of the reactor chamber is a plasma arc reactor head, which includes arc-producing means and entrance ports for feed material (crude antimony trioxide) and the inert gas used to form the plasma or work gas. The plasma arc reactor is of the conventional type having the usual cathode and anode suitably connected to a power supply so that a potential across the electrodes is produced. Inert plasma or work gas is introduced tangentially into the space between the electrodes and an arc is struck between them. By inert is meant that the gas is chemically inert with respect to antimony oxide. The plasma gas also can serve to stabilize the arc and, therefore, is often referred to as the stabilizing gas. Examples of suitable plasma gases include argon, helium, nitrogen, air, and oxygen. As the plasma gas passes through the arc, it is heated to form the plasma. The downstream luminous region external to and contiguous with the plasma is referred to as the tail flame portion of the plasma. The heated plasma gas is forwarded to the reactor chamber where it heats the crude antimony oxide. Calculated temperature of the inert gas heated by the arc heater are between about 2,200° Centigrade and about 2,800° Centigrade, e.g., 2,500°-2,700° Centigrade.

Referring again to the drawings, there is shown reactor or vaporization chamber 1, which openly communicates with the plasma arc reactor head, wherein liquid slag melt 2 accumulates, and vaporized antimony trioxide fills the gas space within the reactor chamber. Liquid slag melt 2 drains from the chamber through the bottom of exit port 3. Vaporized antimony trioxide and liquid slag exhausted from the reactor through exit port 3 is cooled by cooler inert quench gas emanating from a single quenching gas tube 4 located at a right angle to the exit port. Solidified antimony trioxide is collected downstream and is further separated from entrained slag and the inert quench gas, e.g., compressed air. Any of the gases described with respect to the plasma gas, particularly air or nitrogen, can be used as the quench gas. The quench gas is typically at ambient temperatures. The remainder of the solidified slag is collected at the exit port after being cleared from the port by hydraulic cylinder 5, which activates knife or blade 6 periodically to cut away solidified slag which is formed by the cool quench gas. In a further embodiment, a second source of quench gas can be directed from the bottom of the reactor from a further quenching gas tube 7 to contact deflected exit gases coming from exit port 3.

The particle size distribution of the antimony trioxide powder is controlled by the volume of quench gas used to cool the vaporized antimony trioxide. Lower volumes create broader ranges, while higher volumes create narrower ranges. The lower volumes also have a tendency to produce irregular-shaped particles. Typically, the ratio of the volume of quench gas to exhausted hot gas (not including vaporized antimony trioxide) from the reactor chamber will vary between about 8:1 and 12:1, preferably about 8:1 to 9:1. Generally, the higher the ratio of quench gas to exhausted gas, the smaller the size of the powder particles produced and vice versa. Further, the faster the exhausted particles are quenched to less than 300° C., the smaller the particles produced tend to be. Conversely, the slower the rate of quenching from the exhaust temperature to less than 300° C., the larger the size of the particles produced due to growth of the particles during cooling.

Now that the inventive concept has been described depicting certain embodiments, particular examples will be set forth to further illustrate the invention. However, neither the described embodiments nor these particular examples should be considered as a limitation on the scope of the invention.

EXAMPLE I

Utilizing apparatus of the nature depicted in the attached Figures, a feed of crude antimony trioxide containing 96 percent antimony trioxide, 1 percent silica, 0.2 percent lead, 0.1 percent iron, and 0.4 percent arsenic, and traces of sulfate is fed at the rate of 78 pounds per hour into the vicinity of the tail flame portion of a plasma produced by a conventional plasma arc generator using nitrogen as the stabilizer and plasma gas. The crude antimony oxide is introduced through two inlet tubes located at an angle of 45° to the vertical in the top of the reactor chamber on either side of the plasma heater. The crude antimony oxide is conveyed by a carrier gas of air, which is used in amounts of from about 1 to 2, e.g., 1.5-1.8, SCFH (standard cubic feet per hour) of air per pound of antimony oxide feed. The plasma heater was connected to a power supply which was operated with a power input of 64 kilowatts. The calculated temperature of the reactor chamber entrance, i.e., the tail flame portion of the plasma was about 2,500° Centigrade.

Vaporized antimony trioxide and exhausted gas having a temperature of about 1,000° C. exits the reactor chamber at the rate of about 1,060 SCFH through a 1½-inch diameter port. Liquified slag drains out of the chamber at the bottom of the exit port. Both the liquified slag and vaporized antimony trioxide effluents are contacted with 10,000 SCFH compressed air at 25° Centigrade as the quench gas. A portion of this gas is directed through an opening 2.46 inches in diameter, 1 inch above the exit port, and ¾ inch away from the exit port. The remainder is directed from below the reactor to contact the part of the exiting stream which is deflected in the downward direction so that it is completely quenched. Knife blade 6 is activated every 15 seconds to clear solidified slag away from the exit port.

The product antimony trioxide powder had a mean particle size by weight of 0.275 microns (0.000275 mm) and the following particle size distribution.

| Size (in microns) | Percentage of Particles by Population |
|---|---|
| <.02 | 58.3% |
| .02–.05 | 22.3% |
| .05–.1 | 13.2% |
| .1–.2 | 6.0% |
| .2–.3 | .3% |

| Size (in microns) | Percentage of Particles by Weight |
|---|---|
| <0.2 | 37.5% |
| 0.2–0.5 | 37.0% |
| 0.5–1.0 | 12.5% |
| 1.0–2.0 | 7.5% |
| 2.0–3.0 | 3.5% |
| 3.0–4.0 | 2.0% |
| >4.0 | 0.5% |

The product was tested and was found to have a low tint strength. In ABS with a virgin izod impact strength of 8, there was impact strength of 7.4 with the antimony trioxide and a halogenated ether incorporated therein.

EXAMPLE II

In accordance with the procedure of Example I and utilizing apparatus of the nature depicted in the attached Figures, a feed of crude antimony trioxide containing 96 percent antimony trioxide, 1 percent silica, 0.2 percent lead, 0.1 percent iron, and 0.4 percent arsenic, and traces of sulfate is fed at a rate of about 100 pounds per hour with a carrier gas of air at a rate of about 250 SCFH into the vicinity of the tail flame portion of a nitrogen plasma. The plasma heater was connected to a power supply operated with a power input of 100 kilowatts. The calculated temperature of the reactor entrance near the plasma tail flame was about 2,700° Centigrade.

Vaporized antimony trioxide and exhausted gas having a temperature of about 1,200° Centigrade exits the reactor chamber at the rate of about 1200 SCFH through a 2.5 inch diameter port. Liquified slag drains out of the chamber at the bottom of the exit port. The effluents are contacted with 10,000 SCFH of compressed air at 25° Centigrade as the quench gas, which is directed through an opening 2.46 inches in diameter, 1 inch above the exit port, and ¾ inch away from the exit port. Knife blade 6 is activated every 15 seconds to clear solidified slag away from the exit port.

The product antimony trioxide powder had a mean particle size by weight of 0.320 microns (0.000320 mm) and the following particle size distribution:

| Size (in microns) | Percentage of Particles by Weight |
|---|---|
| <0.2 | 27.0% |
| 0.2–0.5 | 42.0% |
| 0.5–1.0 | 18.0% |
| 1.0–2.0 | 8.0% |
| 2.0–3.0 | 2.0% |
| 3.0–4.0 | 1.0% |
| >4.0 | 2.0% |

While the invention has been described with reference to specific details of certain illustrative embodiments, it is not intended that it shall be limited thereby, except insofar as such appear in the accompanying claims.

We claim:

1. A method of preparing submicron antimony trioxide powder, which comprises heating within a reactor having a side exit port crude antimony trioxide containing from 1 to 10 weight percent of metal oxide impurities less volatile than antimony trioxide with an inert gas heated by a plasma arc, said heated inert gas having a temperature sufficient to vaporize the antimony trioxide and form a liquid slag of the less volatile metal oxide impurities of the crude antimony trioxide, removing vaporized antimony trioxide in a stream of exhausted hot gas, and liquid slag through said exit port, contacting the exiting vaporized antimony trioxide and liquid slag with an inert quench gas, thereby to condense vaporized antimony trioxide, separating condensed antimony trioxide powder having a weight mean particle size of between about 0.1 and about 0.5 micron from the exhausted gas, and mechanically removing solidified slag periodically from the exit port.

2. The method of claim 1 wherein the ratio of the volume of quench gas to exhausted hot gas from the reactor is between about 8:1 and 12:1.

3. The method of claim 2 wherein the ratio is between about 8:1 and 9:1.

4. The method of claims 1 or 2 wherein between about 5 and 15 weight percent of the condensed antimony trioxide powder is larger than 1 micron and above about 90 percent of the antimony trioxide particles are less than 1 micron in size.

5. The method of claim 1 wherein the calculated temperature of the heated plasma gas is between about 2200° C. and about 2800° C.

6. The method of claim 1 wherein the crude antimony trioxide comprises between 90 percent and 99 percent antimony trioxide.

7. A method of preparing submicron antimony trioxide powder, which comprises heating within a reactor having a side exit port crude antimony trioxide containing from 90 to 99 percent by weight antimony trioxide and from 1 to 10 weight percent of metal oxide impurities less volatile than antimony trioxide with an inert gas heated by a plasma arc, said heated inert gas having a temperature sufficient to vaporize the antimony trioxide and form a liquid slag of the less volatile metal oxide impurities of the crude antimony trioxide, removing vaporized antimony trioxide in a stream of exhausted hot gas, and liquid slag through said exit port, contacting the exiting vaporized antimony trioxide and liquid slag with an inert quench gas, the ratio of the volume of quench gas to exhausted hot gas exhausted from the reactor being between about 8:1 and 12:1, thereby to condense vaporized antimony trioxide, separating condensed antimony trioxide powder having a weight mean particle size of between about 0.1 and about 0.5 microns from the exhausted gas, and mechanically removing solidified slag periodically from the exit port.

8. The method of claim 7 wherein the ratio of the volume of quench gas to exhausted gas is between 8:1 and 9:1.

9. The method of claim 8 wherein the calculated temperature of the heated plasma gas is between about 2500° C. and 2700° C.

10. The method of claim 8 wherein the vaporized antimony trioxide removed from the reactor is quenched rapidly to below 300° C.

* * * * *